(12) United States Patent
Li

(10) Patent No.: US 7,933,264 B2
(45) Date of Patent: Apr. 26, 2011

(54) SERIAL MULTIPLEXER MODULE FOR SERVER MANAGEMENT

(75) Inventor: Hu Li, Shanghai (CN)

(73) Assignee: Mitac International Corp., Hsinchu County (TW)

( * ) Notice: Subject to any disclaimer, the term of this patent is extended or adjusted under 35 U.S.C. 154(b) by 1378 days.

(21) Appl. No.: 11/435,740

(22) Filed: May 18, 2006

(65) Prior Publication Data

US 2007/0116067 A1   May 24, 2007

(30) Foreign Application Priority Data

Nov. 23, 2005   (TW) ................................ 94141201 A

(51) Int. Cl.
*H04L 12/50* (2006.01)
*H04L 12/28* (2006.01)
(52) U.S. Cl. ........................................ 370/360; 370/323
(58) Field of Classification Search .................. 370/323, 370/360

See application file for complete search history.

(56) References Cited

U.S. PATENT DOCUMENTS

| | | | | |
|---|---|---|---|---|
| 5,008,633 A | * | 4/1991 | Hom | 330/277 |
| 5,937,030 A | * | 8/1999 | Miyashita et al. | 379/1.01 |
| 6,130,570 A | * | 10/2000 | Pan et al. | 327/431 |
| 7,010,630 B2 | * | 3/2006 | Pagan | 710/100 |

* cited by examiner

*Primary Examiner* — Derrick W Ferris
*Assistant Examiner* — Maharishi Khirodhar
(74) *Attorney, Agent, or Firm* — Bacon & Thomas, PLLC

(57) ABSTRACT

A serial multiplexer module for server management includes a first, a second and a third switching devices in circuit connection with a baseboard management controller, a serial transceiver and an input/output controller respectively. Each of the switching devices includes respectively four simplex sub-switches. The simplex sub-switches are controlled to be switched on/off directly/indirectly by a first control signal and/or a second control signal transmitted from the baseboard management controller, thereby enabling and monitoring the communication between the baseboard management controller, the input/output controller and the serial transceiver.

16 Claims, 12 Drawing Sheets

SERIAL MULTIPLEXER MODULE FOR SERVER MANAGEMENT

BACKGROUND

1. Field of Invention

The invention relates a serial multiplexer module, and in particular to a serial multiplexer module suitable for use in a server management system.

2. Related Art

In recent years, the Intelligent Platform Management Interface (IPMI) has been widely used in the server-related systems, and that is used to provide a cross platform interface to monitor most of the conditions of a server (for example, the voltage, system temperature, and the rotation speed of the heat dissipation fan), so that the management software provided by the various providers can be run on the various firmware and hardware platforms.

In general, in the framework of Intelligent Platform Management Interface (IPMI), the central portion is composed of the Baseboard Management Controller (BMC). Thus, BMC is utilized to monitor, control and manage the server systems through the various interfaces, and to achieve external communication through network ports or serial ports to transmit/receive external data packets.

In this respect, refer to FIG. 1 for a schematic diagram of the basic structure of a Baseboard Management Controller (BMC) according to the prior art. Usually, plural sets of Inter-Integrated Circuit (IIC/I2C) interfaces are provided in a BMC 100, to read the system detection value and record the related data, and are utilized to connect to the outside GPIO controller via the General-Purpose Input/Output (GPIO) pin G, thus further expanding the detection function of the system.

In addition, IPMI can be utilized to communicate with the outside control unit, such as the various sub-systems of the Peripheral Management Controller (PMC), management storage equipment or hard disk baseboard, by making use of the Intelligent Platform Management Bus (IPMB) of the IIC interface 12C.

Furthermore, usually the low pin count (LPC) interface is utilized in most of BMC 100 as the data transmission interface, and is mainly used to communicate with the central processing unit (CPU). Alternatively, the parallel address/data bus and the system management bus may be utilized in place of the LPC interface.

Usually, BMC is provided with a plurality of analog-to-digital converters (A/D converter) for monitoring the operational voltage, and counters for monitoring the fan speed, the pulse width modulation (PWM) or the D/A output of the fan driven, and the universal input/output (I/O) port, serial port and 12C bus used for connecting to the outside inductor and component interface expansion. Since BMC and its outside interface elements may be operational by remaining in the standby state. Thus, BMC may be used to provide continuously the management functions, regardless of the power supply condition of the system.

Moreover, the serial/modem interface is defined, so that the system manager may receive the IPMI message directly from IPMI or through a modem, namely, the serial port SP of BMC 100 may be utilized as the communication channel to receive or transmit orders or commands. In other words, RS-232 interface is used to introduce BMC 100, so that the manager at the remote end may utilize the programs at the terminal to execute the command sequence to manage the system through a serial port SP of BMC 100. Alternatively, the serial port SP of BMC 100 may be bridged to a serial port of a controller (for example, a serial port on the serial input/output (I/O) controller, or a serial port on the floppy disk controller) of a system, so that the frame images of the console may be output to BMC 100 via the serial port of the system. As such, the data of console may be transmitted to the manager at remote end from BMC 100 through a local area network (LAN).

From the above discussion, it is evident that, in the management of the server systems, BMC can be utilized to achieve the management of console through serial/modem interface or LAN.

Next, refer to FIG. 2 for a block diagram of a serial multiplexer module according to the prior art, wherein, the BMC 100 is utilized to proceed with the switching between the above two control modes through a serial multiplexer module 110. In case that LAN is utilized to execute the management of the system, the serial port SP of BMC 100 is connected to the serial port SP of floppy diskette controller 210 of the system 200 by means of the serial multiplexer module 110. At this time, the normal console redirection is obtained by BMC 100 from SiO 210, so as to introduce BMC 100 into LAN, thus enabling the system manager at remote end to proceed with the management of the system through LAN.

However, in case that serial connection is utilized to proceed with the management of the system, then the serial port SP of BMC 100 is switched and connected to a serial transceiver 200 (such as RS 132 transceiver) of the system 200 by means of the serial multiplexer module 110, so that the system manager may issue order or command to BMC 100 through the serial connection to proceed with the management of the system. In this case, the serial transceiver 220 is used to receive the serial communication signals from the communication port (COM port) 222 (for example, the DB9 communication port), and transmit the serial communication signals through the communication port (COM port) 222.

In the prior art, the serial multiplexer module 110 is composed of three respective multiplexers 112, 114, and 116 having 8 fan-ins and 4 fan-outs as shown in FIG. 2. Wherein, each of the multiplexers 112, 114, and 116 is provided with two input terminals (hereinafter referred to as the first input terminal A and the second input terminal B), output terminal and a control terminal. Among them, the control terminal is connected to the GPIO pin G of BMC 100, and the output terminal is connected to the serial port SP of BMC 100, the serial port SP of SIO 210, and the serial transceiver 220 of system 200. The first input terminal A of the multiplexer 112 is connected to the first input terminal A of the multiplexer 114, while the second terminal B of multiplexer 112 is connected to the first terminal A of multiplexer 116 and the serial port SP of SIO 210, and the second input terminal B of multiplexer 114 and the second terminal B of multiplexer 116 are connected to each other. However, the production cost for realizing such a serial multiplexer module 110 is rather high, besides, its structure is rather complex. Thus, the construction and configuration of the existing serial multiplexer module has much room for improvement.

SUMMARY OF THE INVENTION

In view of the problems and shortcomings of the prior art, the present invention is to provide a serial multiplexer module, thus solving the problem of complex structure and high production cost of the prior art.

Therefore, the invention discloses a serial multiplexer module, which is used to control the communications between the Baseboard Management Controller (BMC), the I/O Controller, and the serial transceiver. Wherein, the I/O controller and the serial transceiver are disposed on the mother board of the computer system. The serial multiplexer includes a first, second, and third switching devices. Among them, the first switching device is connected to the BMC and I/O Controller via circuit connection, and is controlled directly/indirectly by a first control signal transmitted by BMC; the second switching device is connected to the I/O Controller and the serial transceiver via circuit connection, and is controlled directly/indirectly by a second control signal transmitted by BMC; and the third switching device is connected to the BMC and the serial transceiver via circuit connection, and is controlled directly/indirectly by the first control signal and the second control signals. In the above-mentioned structure, the first, second, and third switching devices are provided respectively with four simplex sub-switches, that are controlled directly/indirectly by the first control signal and/or the second control signal to be turned-on or turned-off accordingly.

According to one embodiment of the invention, the serial multiplexer module of the invention is further provided with one or more buffers, a first inverter, and a second inverter; that are used to generate a first inversion signal and a second inversion signal respectively.

According to another embodiment of the invention, the third switching device is further provided with a multiplexer sub-switch and a third inverter. The multiplexer sub-switch is used to generate an enable-signal according to the first control signal and the second control signal. The third inverter is used to generate the inverted enable-signal.

According to yet another embodiment of the invention, the second switching device is connected to the serial transceiver via the first link connection, and is connected to the I/O controller via the second link connection; and the third switching device is connected to the first link connection or the second link connection through the third link connection, so that BMC may monitor the communication between the serial transceiver and the I/O controller.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description given hereinbelow for illustration only, and thus are not limitative of the invention, and wherein.

DETAILED DESCRIPTION OF THE INVENTION

The purpose, construction, features, and functions of the invention can be appreciated and understood more thoroughly through the following detailed description with reference to the attached drawings.

Figure 1:
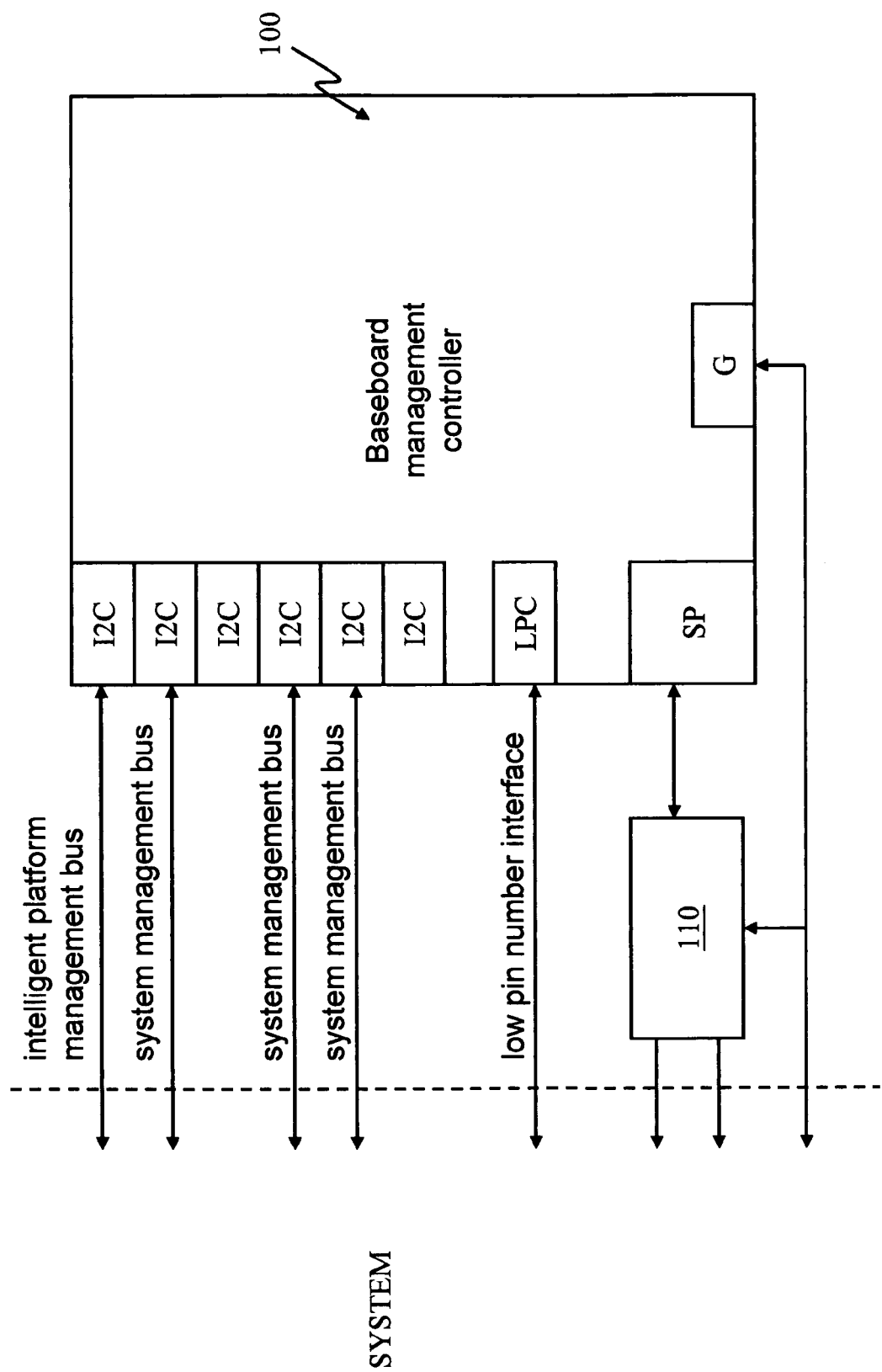
FIG. 1 is a schematic diagram of the basic structure of a Baseboard Management Controller (BMC) according to the prior art.
Figure 2:
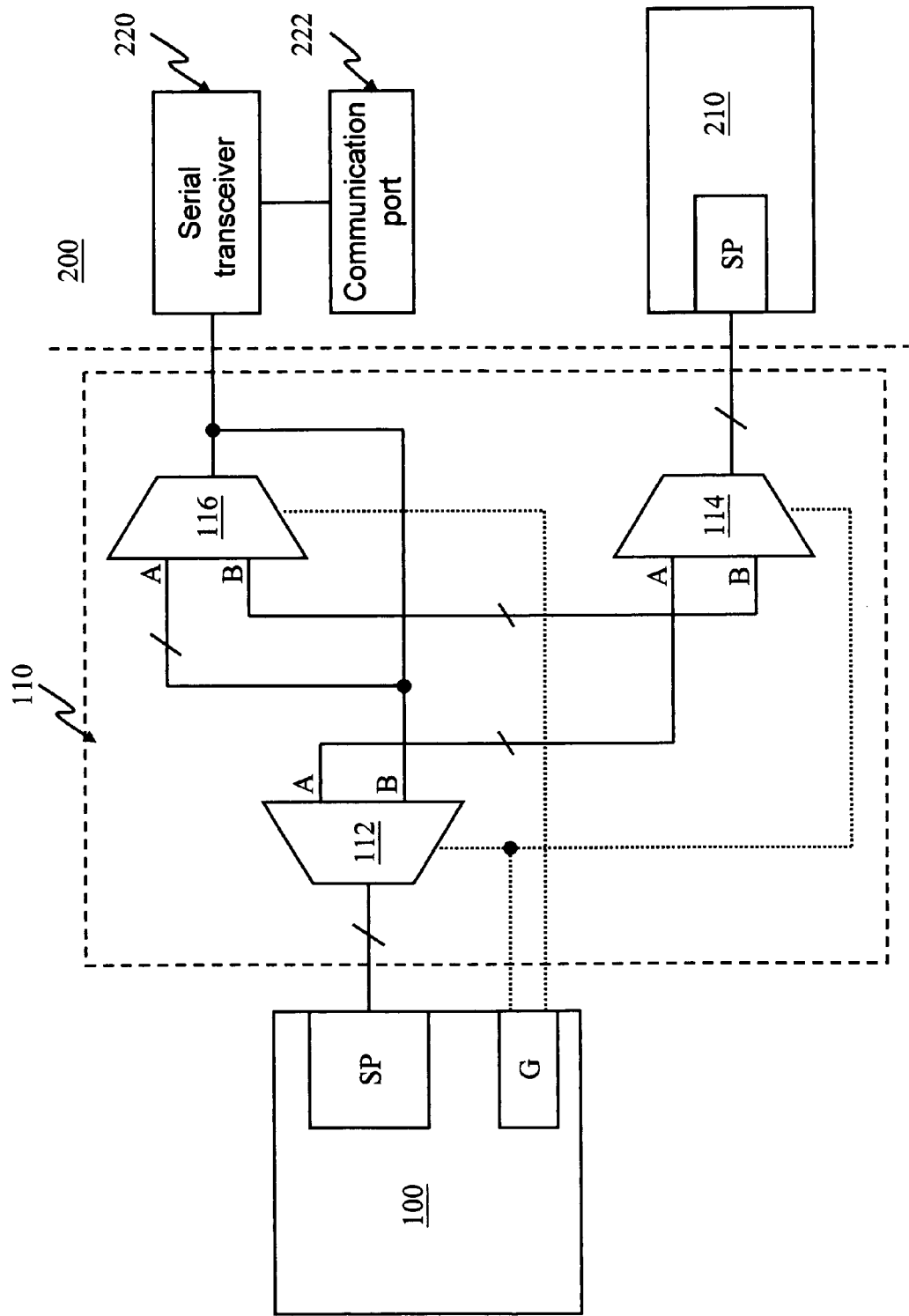
FIG. 2 is a block diagram of a serial multiplexer module according to the prior art.
Figure 3:
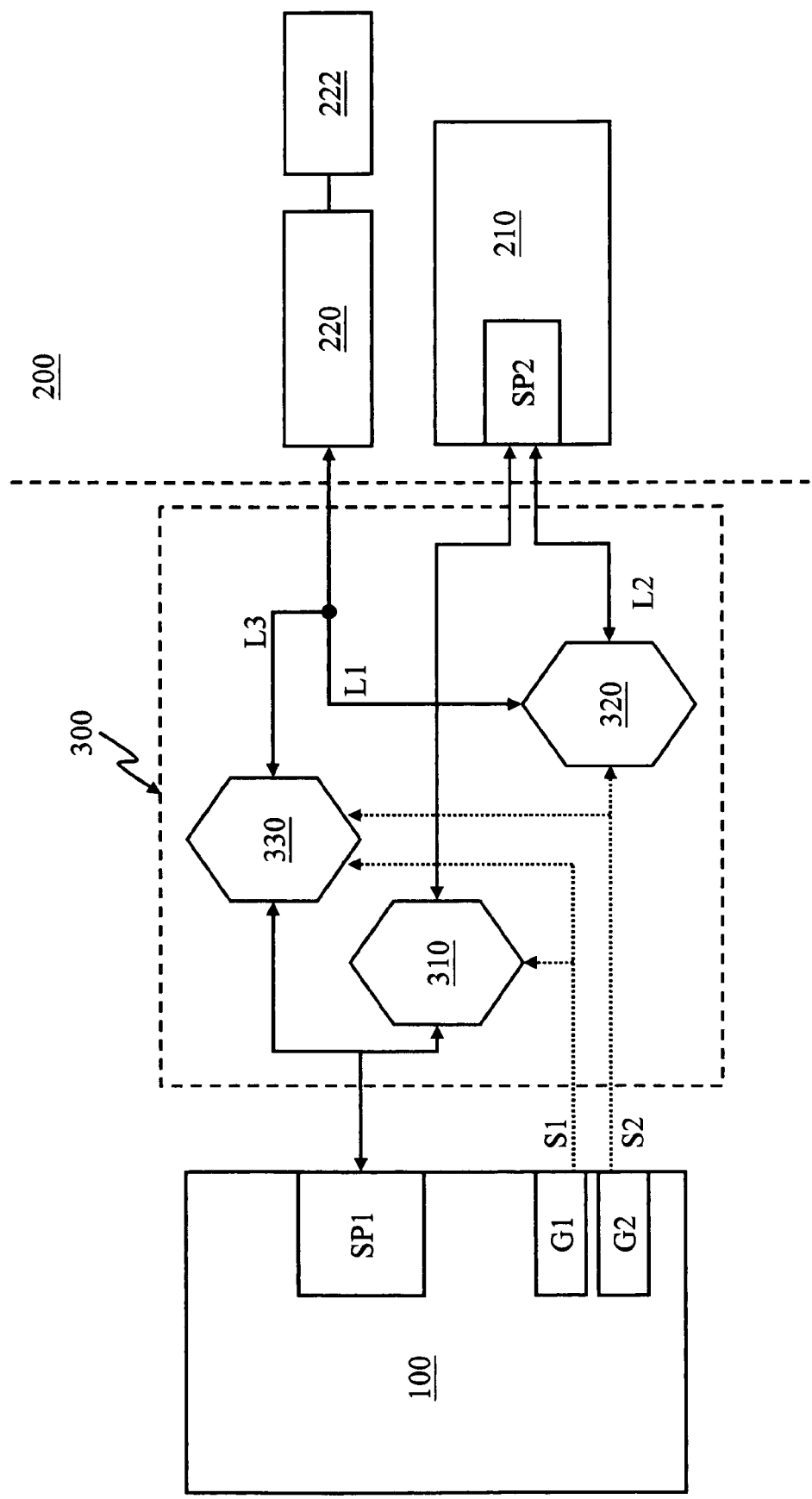
FIG. 3 is a block diagram of a serial multiplexer module according to an embodiment of the invention.

Firstly, refer to FIG. 3 for a block diagram of a serial multiplexer module according to an embodiment of the invention. As shown in FIG. 3, the serial multiplexer module 300 is provided with a first switching device 310, a second switching device 320, and a third switching device 330. The details of the above devices will be described as follows.

The first switching device 310, connected to the following through circuit connection: the serial port SP1 of the Baseboard Management Controller 100, the pin G1 of General-Purpose Input/Output (GIPO), and the serial port SP2 of the I/O Controller 210 of system 200; and is controlled by the first control signal S1 transmitted by BMC 100 via the GPIO pin.

The second switching device 320, connected to the serial transceiver 220 of system 200 through the first link connection L1, connected to the serial port SP2 of the I/O controller 210 through the second link connector L2, and connected to the GPIO pin G2 of BMC 100 via circuit connection; and is controlled by the second control signal S2 transmitted by BMC 100 via GPIO pin G2.

The third switching device 330, connected to both the two pins G1 and G2 of GPIO, and the serial port SP1 of BMC 100; moreover, it is connected to a first link connection L1 and/or a second link connection L2 via a third link connection L3. The third switching device 330 is controlled by the first and control signals S1 and S2 transmitted by BMC 100 via GPIO pins G1 and G2 respectively. The first, second, and third link connections L1, L2, and L3 are a single trace or a connection circuit respectively.

The first control signal S1 and second control signal S2 are output from the GPIO pins G1 and G2 of BMC 100, and reach system 200 through the control of the first switching device 310, the second switching device 320, and the third switching device 330, which constitute the following three communication paths respectively: the communication path from the serial port SP1 of BMC 100 to the serial port SP2 of the I/O controller 210; the communication path from the serial port SP1 of BMC 100 to the serial transceiver 220 of system 200; and the communication path from the serial port SP2 of the I/O controller 210 to the serial transceiver 220 of system 200. As such, through the third link connection L3, BMC 100 can monitor the communication between the first link connection L1 and the second link connection L2, namely, the communication between the serial transceiver 220 and the serial port SP2 of the I/O controller 210.

In case that the local area network (LAN) is utilized to control system 200; the BMC 100 is used to redirect the communication path to the serial port SP2 of the I/O controller 210, then system 200 is controlled by the remote controller through the local area network (LAN). In this case, a second control signal S2 of '1' (high voltage) is output by BMC 100 via GPIO pin G2, and a first control signal S1 of '0' (low voltage) is output by BMC 100 via GPIO pin G1, so that the first switching device 310 is turned on, and the remaining two switching devices are turned off. Thus, the serial port SP1 of BMC 100 is in communication with the serial port SP2 of the I/O controller 210.

Furthermore, in case that the local console is utilized to control system 200, then BMC 100 is used to redirect the communication path to the serial transceiver 220 and its communication port 222. In this embodiment, a first and second control signals S1 and S2 both of '1' (high voltage) are output by BMC 100 via GPIO pins G1 and G2 respectively, so as to enable the third switching device 33, and turn off the first and second switching devices 310 and 320, namely, enable the serial port SP1 of BMC 100 to communicate with serial transceiver 220 and its communication port 222.

Moreover, in case that the serial transceiver 220 is to be enabled to achieve serial connection with the I/O controller 210, a second control signal S2 of '0' is output from BMC 100 via GPIO pin G2, and a first control signal S of '1' is output from BMC 100 via GPIO pin G1, so that the second switching device 320 is turned on, as such the serial transceiver 220 and the I/O controller 210 are interconnected. Meanwhile, since the third switching device 330 may also be turned on, thus BMC 100 may monitor the communication between the first and second link connections L1 and L2 via the third link connection L3.

In this respect, four kinds of signals may be transmitted over the above-mentioned communication paths: receiving-data signal, transmitting-data signal, clear-to-send signal (CTS), and request-to-send signal (RTS).

In the above description, the system can be a computer system, and the I/O controller 210 and serial transceiver 220 are both disposed on the mother board (not shown) of the computer system. The serial transceiver 220 is used to receive the serial communication signals from the communication port (COM port) 222, and transmit the serial communication signals through the communication port (COM port) 222. As such, the serial transceiver can be RS 132 transceiver, and the communication port can be DB9 communication port. Besides, the I/O controller can be a serial I/O controller or a floppy disk controller.

Furthermore, BMC and the system can be disposed on two separate mother boards. For instance, BMC may be provided on an interface card, such as the server management daughter card (SMDC), while the system may be disposed on a mother board. Then, the interface card and mother board are connected together through a connection interface, such as a Peripheral Component Interconnect (PCI), or through cables. As such, the serial multiplexer module and BMC may both be disposed on the interface card, or both the devices may be provided on the mother board together with the system, or, alternatively, the serial multiplexer module and BMC may be disposed separately on the mother board and the interface card respectively.

In addition, BMC and the system can be provided on the same mother board.

Subsequently, the construction of the serial multiplexer module according to the invention will be described in detail.

Figure 4:
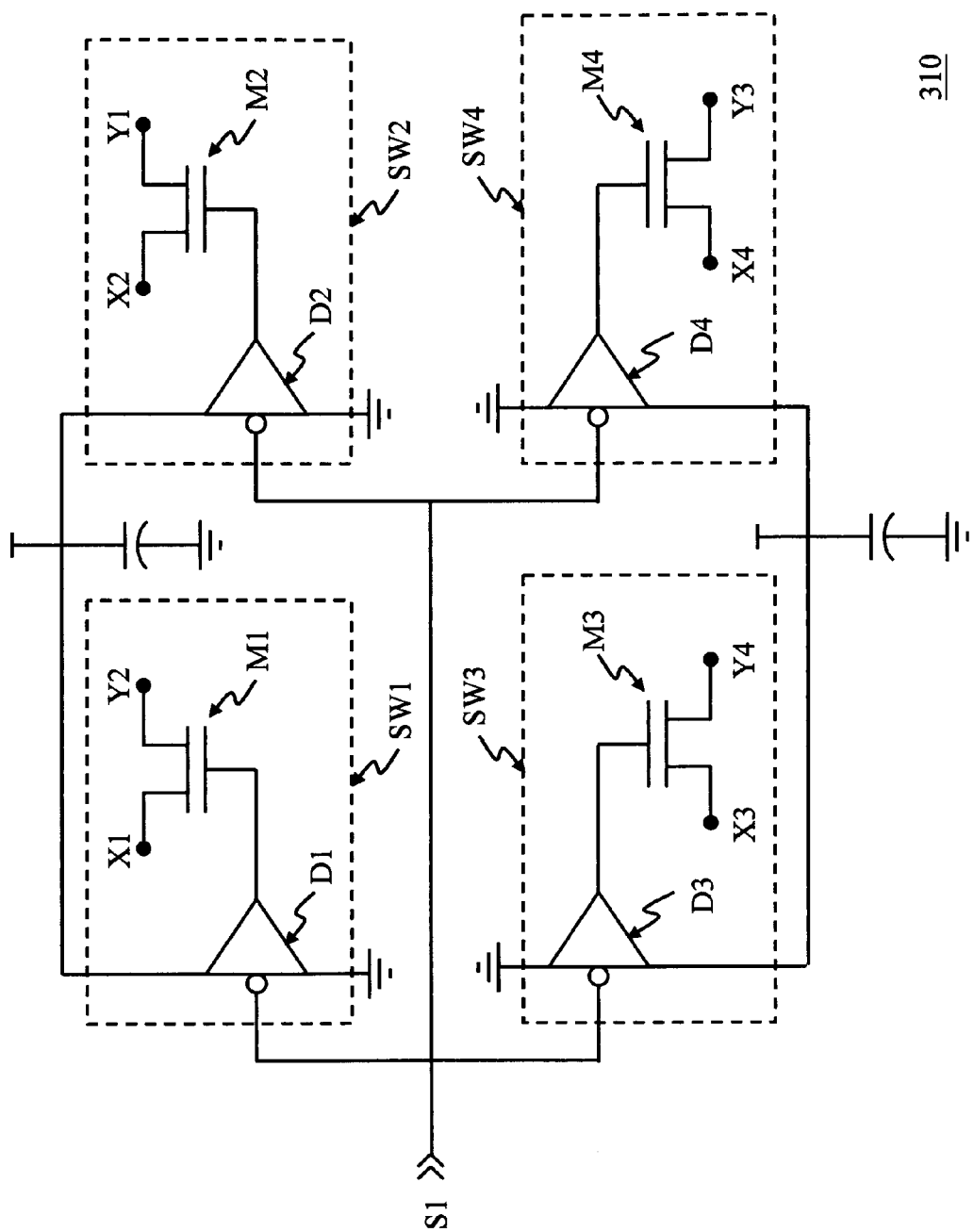
FIG. 4 is a circuit diagram of the first switching device shown in FIG. 3 according to a first embodiment of the invention.

Refer to FIG. 4 for a circuit diagram of the first switching device 310 shown in FIG. 3 according to a first embodiment of the invention. As shown in FIG. 4, the first switching device 310 is composed of four sets of switches, which will be referred to in the following as the first switch SW1, the second switch SW2, the third switch SW3, and the forth switch SW4 respectively. And each of the respective switches is provided with a corresponding simplex sub-switch M1, M2, M3, or M4. For each of the simplex sub-switches M1, M2, M3, and M4, the terminals X1, X2, X3, and X4 are connected to the serial ports of BMC, while the terminals Y1, Y2, Y3, and Y4 are connected to the serial ports of the I/O controller respectively.

In the above-mentioned structure, the communication path between the serial port of BMC and the serial port of the I/O controller can be utilized to transmit four kinds of signals, namely, the receiving-data signal, the transmitting-data signal, the clear-to-send signal, and the request-to-send signal. For easy of understanding and explanation, assuming that terminals X1 and Y1 are used for the receiving-data signals, terminals X1 and Y2 are used for the transmitting-data signals, terminals X3 and Y3 are used for the clear-to-send signals, and terminals X4 and Y4 are used for the request-to-send signals.

In the embodiment of the invention, the first control signal S1 is input into the four sets of switches (namely, the first switch SW1, the second switch SW2, the third switch SW3, and the fourth switch SW4), hereby controlling the respective simplex sub-switches M1, M2, M3, and M4 contained in the four switches. In other words, upon being inverted and then buffered by the buffers D1, D2, D3, and D4, the first control signal S1 is used to control respectively the simplex sub-switch M1 in conducting the path between terminals X1 and Y2, control the simplex sub-switch M2 in conducting the path between terminals X2 and Y1, control the simplex sub-switch M3 in conducting the path between terminals X3 and Y4; and control the simplex sub-switch M4 in conducting the path between terminals X4 and Y3. As such, to switch on/off of the communication path between the serial port of BMC and the serial port of the I/O controller can be realized.

Figure 5A:
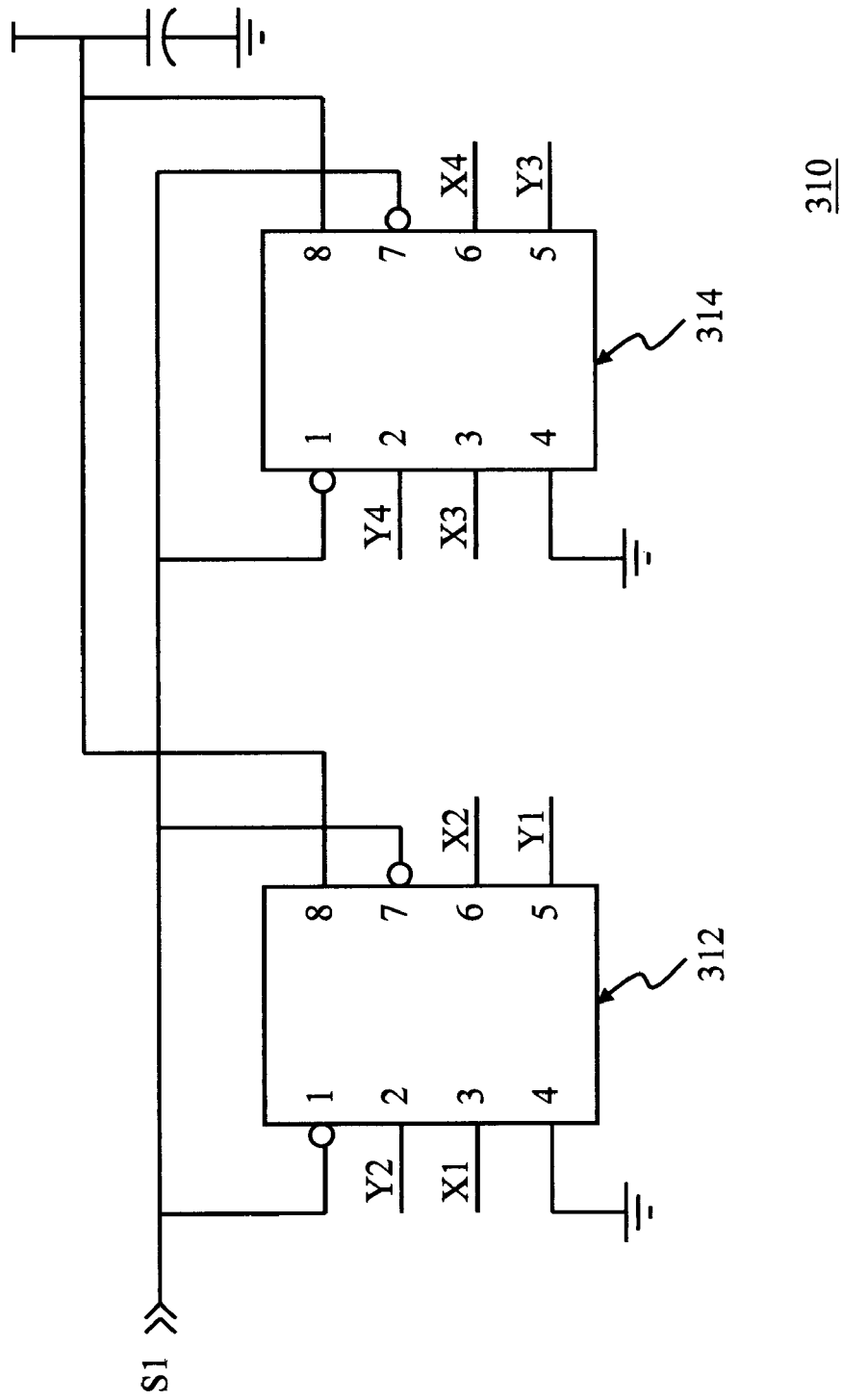
FIG. 5A is a circuit diagram of the first switching device shown in FIG. 3 according to a second embodiment of the invention.

Alternatively, the above-mentioned switches can be combined two-by-two into a single integrated circuit (IC). For easy understanding and explanation, assuming that the IC 312 is used to replace the above-mentioned first and third switches, while IC 314 is used to replace the above-mentioned second and fourth switches as shown in FIG. 5A. In other words, the first switching device 310 can be realized by the two ICs 312 and 314. As such, each of the ICs is used to replace the two switches. For easy explanation, assuming that IC 312 is used to replace the first and third switches, and IC 314 is used to replace the second and fourth switches. Wherein, pin 4 of IC 312 is connected to ground, pin 8 is used to receive the driving voltage required for IC 312; pins 3 and 6 are terminals X1 and X2 respectively and are connected to the serial ports of BMC, pins 2 and 5 are terminals Y2 and Y1 respectively and are connected to the serial ports of the I/O controller, pins 1 and 7 are used to receive the first control signal S1 and control the conduction of the connection between terminals X1 and Y2 and the conduction of the connection between terminals X2 and Y1. In addition, pin 4 of IC 314 is connected to ground, pin 8 is used to receive the driving voltage required for IC 312, pins 3 and 6 are terminals X3 and X4 respectively and are connected to the serial ports of BMC; pins 2 and 5 are terminals Y4 and Y3 respectively and are connected to the serial ports of the I/O controller, pins 1 and 7 are used to receive the first control signal S1 and control the conduction of the connection between terminals X3 and Y4 and the conduction of connection between terminals X4 and Y3. As such, switching on/off of the communication path between the serial port of BMC and the serial port of the I/O controller can be realized.

Figure 5B:
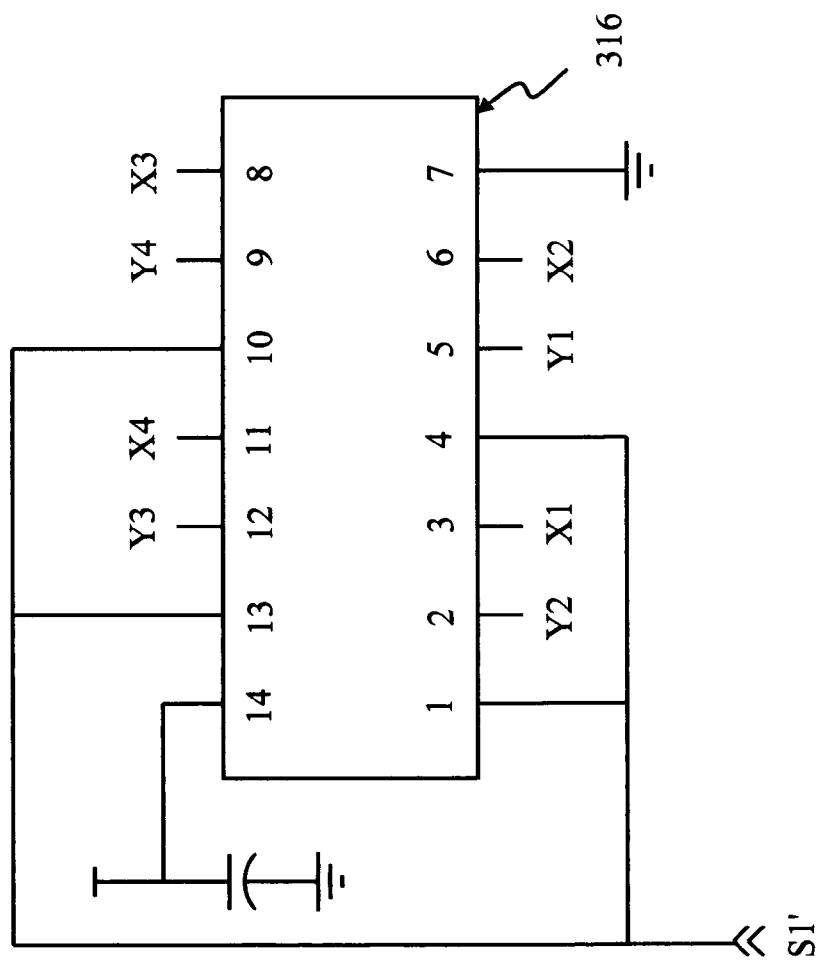
FIG. 5B is a circuit diagram of the first switching device shown in FIG. 3 according to a third embodiment of the invention.

In addition, the four switches of the first switching device 310 can also be realized by making use of an integrated circuit 316, as shown in FIG. 5B. In this respect, pin 7 of IC 316 is connected to ground; pin 14 is used to receive the driving voltage required for the IC 316; pins 3, 6, 8, and 11 are terminals X1, X2, X3, and X4, and are connected to the serial port of BMC respectively; pins 2, 5, 9, and 12 are the terminals Y2, Y1, Y4, and Y3, and are connected to the serial port of the I/O controller respectively.

Figure 6:
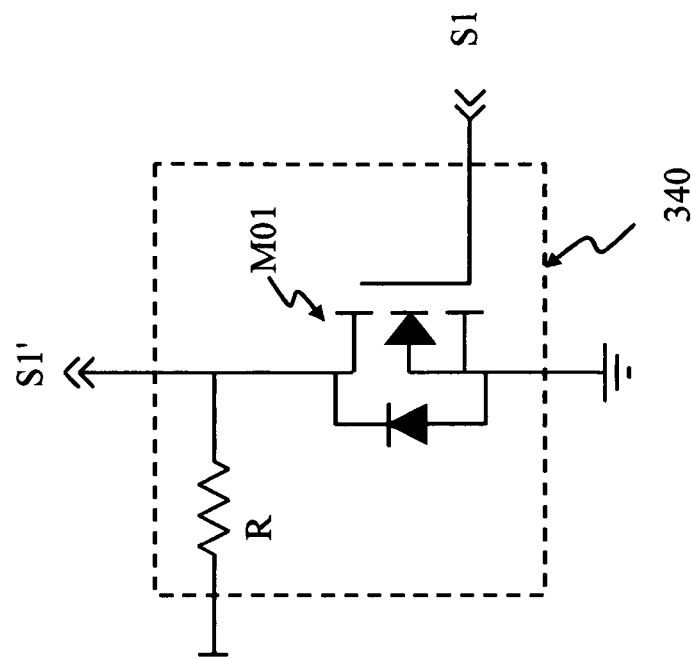
FIG. 6 is a circuit diagram of the inverter circuit used for generating a second inverted signal according to an embodiment of the invention.

In the present embodiment, since the built-in four switches are controlled by the inverted first control signal S1, and for this reason, the inversion function is extracted from FIG. 4 and realized in a device independent and outside the IC 316 of FIG. 5B as an inverter 340 as shown in FIG. 6. Thus, the first control signal S1 is inverted through a first inverter 340 of FIG. 6 into an inverted first control signal S1', and then input to pins 1, 4, 10, and 13, hereby controlling the conduction of the connection between terminals X1 and Y2, the conduction of the connection between terminals X2 and Y1, the conduction of the connection between terminals X3 and Y4, and the conduction of connection between terminals X4 and Y3. As such, switching on/off of the communication path between the serial port of BMC and the serial port of the I/O controller can be realized. In this respect, the inverted first signal is obtained from the first control signal by making use of the first inverter.

Refer to FIG. 6 for a circuit diagram of an inverter circuit used for generating a second inverter signal according to an embodiment of the invention. As shown in FIG. 6, the inverter circuit 340 is composed of a transistor M01, wherein, the source of the transistor M01 is connected to ground; a resistor R; coupled between the drain and the voltage source. Thus a first control signal S1 is input into the gate of transistor M01, and after phase inversion, it is used to generate an inverted first signal S1' from the drain of transistor M01. Herein, the transistor utilized can be a bipolar junction transistor (BJT), a metal-oxide-semiconductor field-effect-transistor (MOSFET) or a junction field transistor (JFET) etc.

Figure 7:
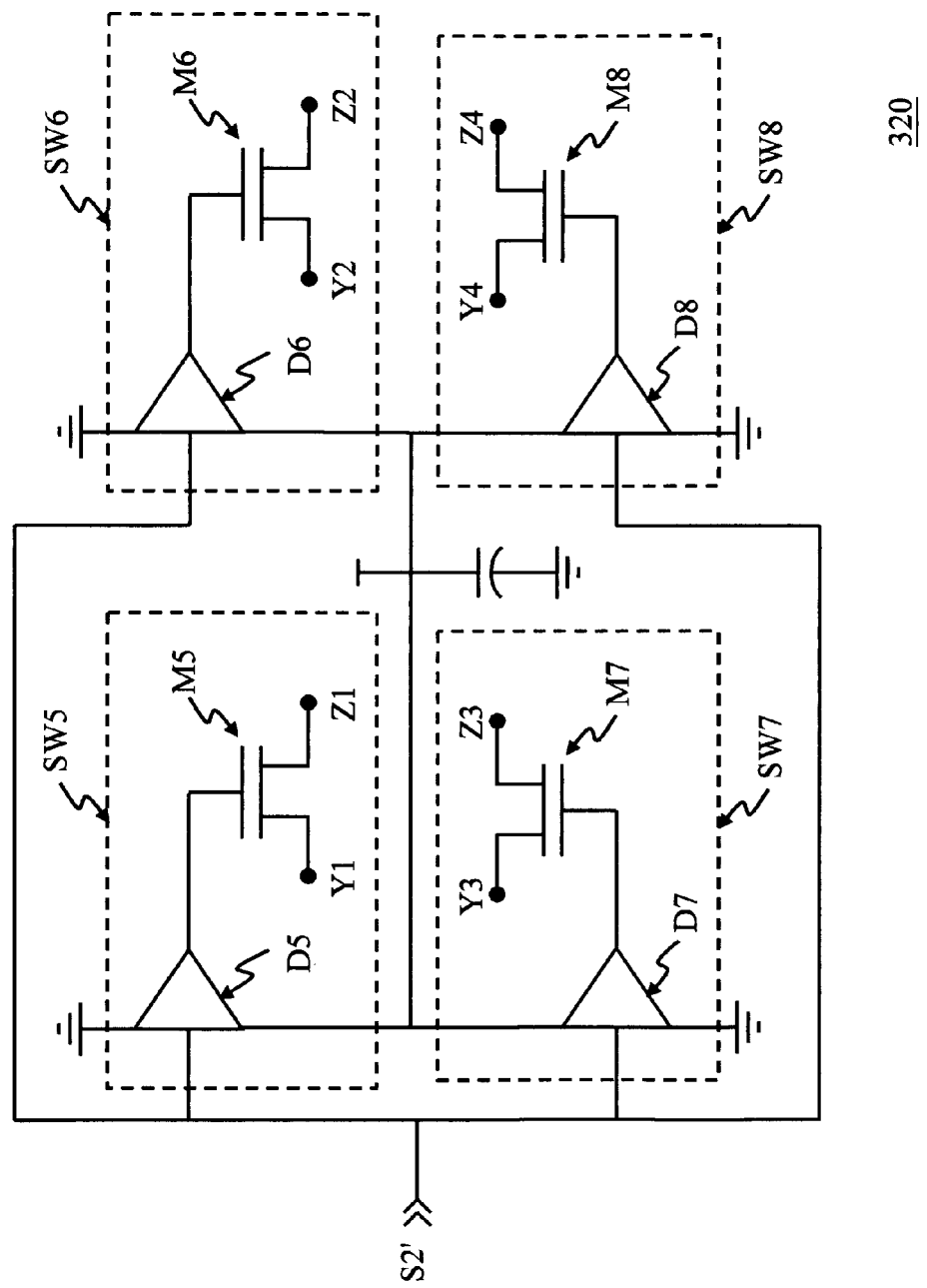
FIG. 7 is a circuit diagram of the second switching device shown in FIG. 3 according to a first embodiment of the invention.

Refer to FIG. 7 for a circuit diagram of the second switching device shown in FIG. 3 according to a first embodiment of the invention. As shown in FIG. 4, the second switching device 320 is composed of four switches, which will be referred to in the following as the fifth switch SW5, the sixth switch SW6, the seventh switch SW7, and the eighth switch SW8 respectively. And each of the respective switches is provided with a corresponding simplex sub-switch M5, M6, M7, or M8. For each of the simplex sub-switches M5, M6, M7, and M8, the terminals Y1, Y2, Y3, and Y4 are connected to the serial ports of the I/O controller, while the terminals Z1, Z2, Z3, and Z4 are connected to the serial transceiver of the system respectively.

In the above-mentioned structure, the communication path between the serial port of the I/O controller and the serial transceiver of the system can be utilized to transmit four kinds of signals, namely, the receiving-data signal, the transmitting-data signal, the clear-to-send signal, and the request-to-send signal. Similarly, for easy of understanding and explanation, assuming that terminals Y1 and Z1 are used for the receiving-data signals, terminals Y2 and Z2 are used for the transmitting-data signals, terminals Y3 and Z3 are used for the clear-to-send signals, and terminals Y4 and Z4 are used for the request-to-send signals.

Figure 8:
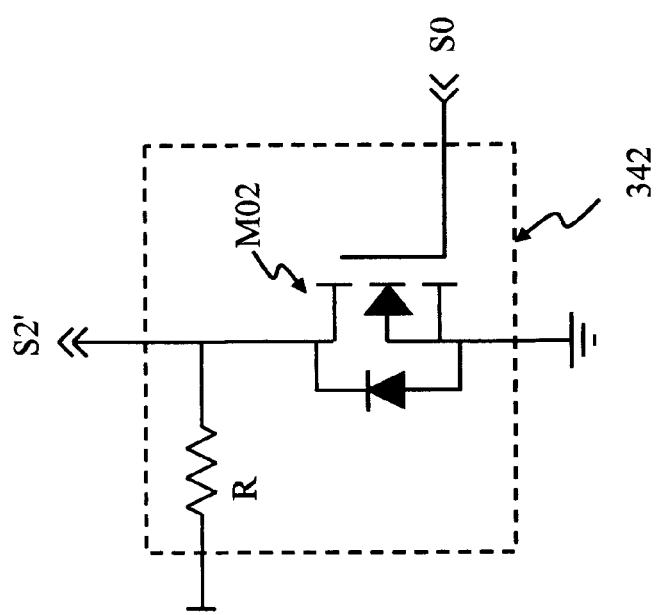
FIG. 8 is a circuit diagram of the inverter circuit used for generating a first inverted signal according to an embodiment of the invention.

Upon being inverted, the second control signal is turned into an inverted second signal S2' and is input into four switches (namely, the fifth switch SW5, the sixth switch SW6, the seventh switch SW7, and the eighth switch SW8), thus controlling the turn-on and turn-off of the respective simplex sub-switches M5, M6, M7, and M8. In other words, upon being buffered by the buffers D5, D6, D7, and D8, the inverted second signal S2' is used to control the simplex sub-switch M5 in conducting the connection between terminals Y1 and Z1, to control the simplex sub-switch M6 in conducting the connection between terminals Y2 and Z2, to control the simplex sub-switch M7 in conducting the connection between terminals Y3 and Z3, and to control the simplex sub-switch M8 in conducting the connection between terminals Y4 and Z4. Wherein, the second inverted signal S2' can be obtained by inverting the second control signal S2 through a second inverter: Herein, the second inverter can be the inverter circuit 342 as shown in FIG. 8. Then, refer to FIG. 8 for a circuit diagram of the inverter circuit used for generating a first inverted signal according to an embodiment of the invention. As shown in FIG. 8, the inverter circuit 342 is composed of a transistor M02. The source of the transistor M02 is connected to ground, a resistor R is coupled between the drain and power supply. A second control signal S2 is input into the gate of the transistor M02, and after inversion, it is turned into an inverted second signal S2' at the drain of transistor M02. Herein, the transistor utilized can be BJT, MOSFET, or JEFT etc.

Figure 9A:
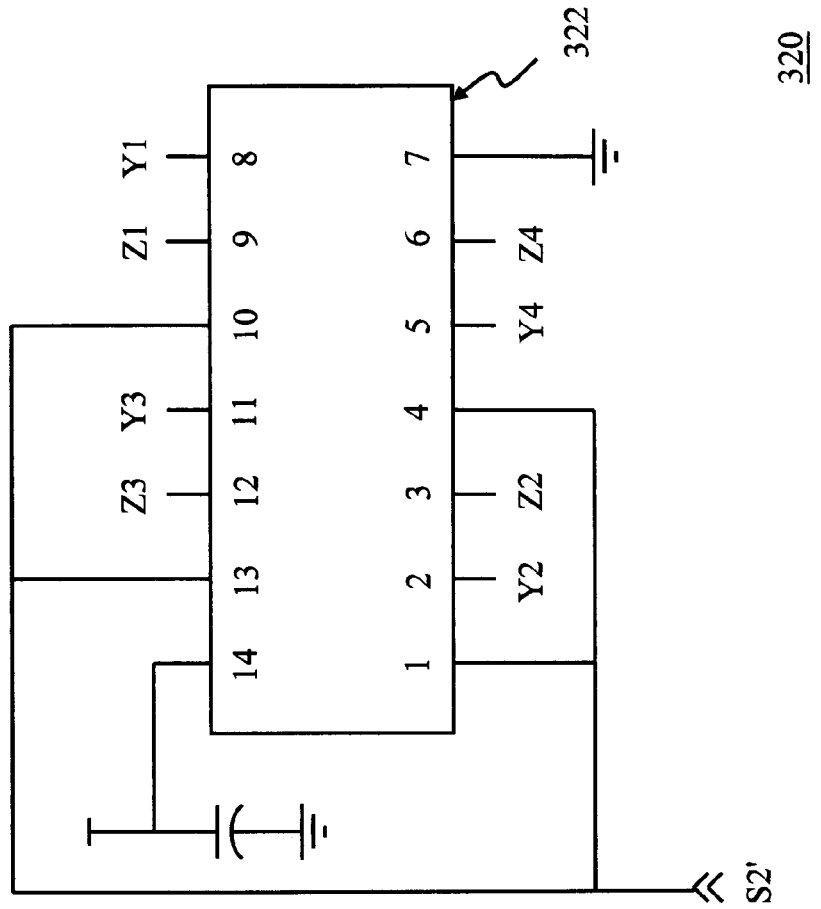
FIG. 9A is a circuit diagram of the second switching device shown in FIG. 3 according to a second embodiment of the invention.

In addition, refer to FIG. 9A, wherein, the second switching device 320 can be realized by an integrated circuit 322. As shown in FIG. 9A, pin 7 of IC 322 is connected to ground; pin 14 is used to receive the power required by IC 322; pins 2, 5, 8 and 11 are terminals Y2, Y4, Y1, and Y3 respectively, and are connected to the serial port of the I/O controller; pins 3, 6, 9 and 12 are terminals Z2, Z4, Z1, and Z3 respectively, and are connected to the serial transceiver of the system. The inverted second signal S2' is input into pins 1, 4, 10, and 13, hereby controlling the conduction of connection between terminals Y2 and Z2, the conduction of connection between terminals Y4 and Z4, the conduction of connection between terminals Y1 and Z1, and the conduction of connection between terminals Y3 and Z3. As such, switching on/off of the communication path between the serial port of the I/O controller and the serial transceiver of the system can be realized.

Figure 9B:
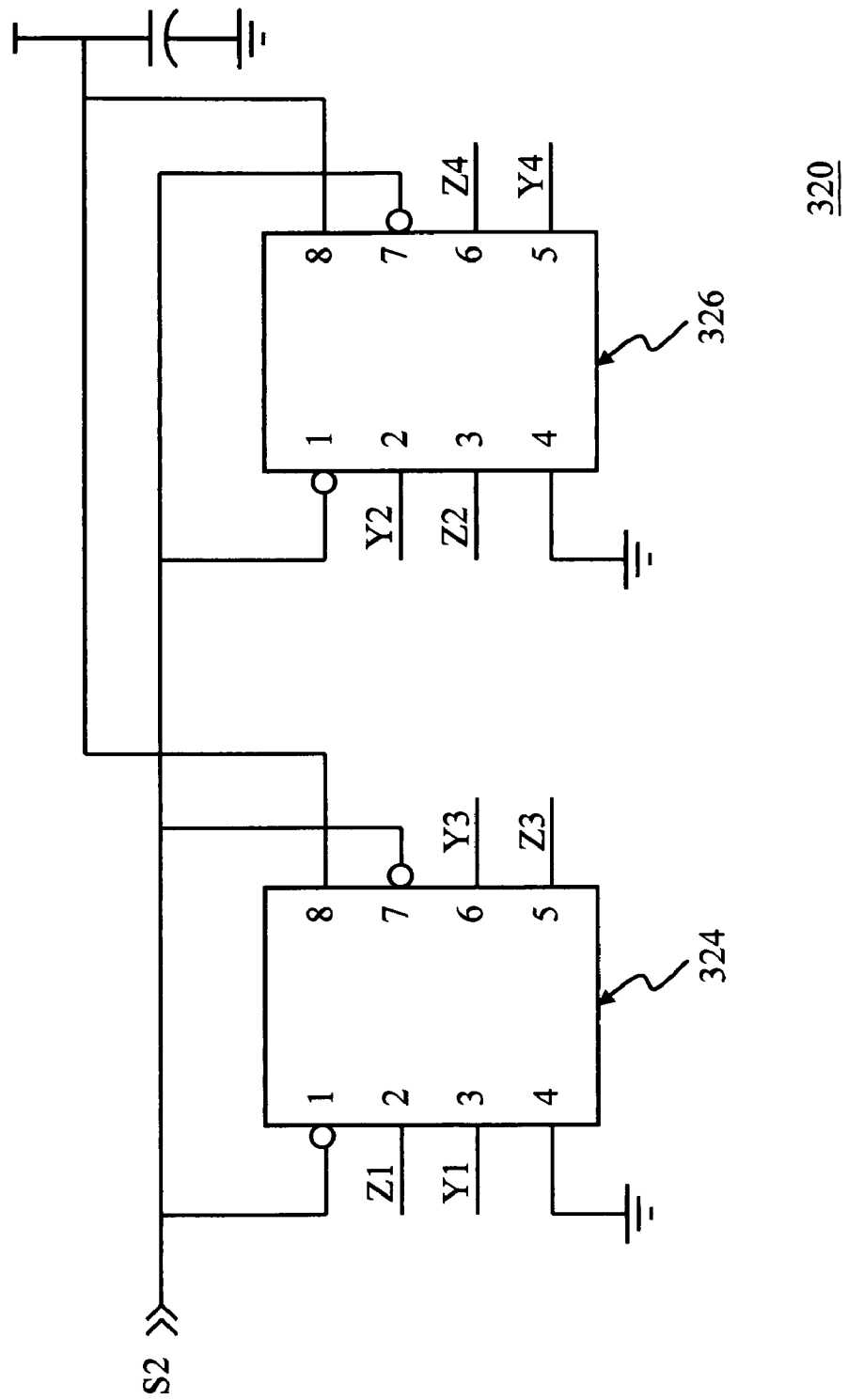
FIG. 9B is a circuit diagram of the second switching device shown in FIG. 3 according to a third embodiment of the invention.

Alternatively, the above-mentioned four switches can be combined two-by-two into a single integrated circuit (IC). For easy understanding and explanation, assuming that the IC 324 is used to replace the above-mentioned fifth and seventh switches, while IC 326 is used to replace the above-mentioned sixth and eighth sets of switches as shown in FIG. 9B. In other words, the second switching device 320 can be realized by the two ICs 324 and 326. Wherein, pin 4 of IC 324 is connected to ground, pin 8 is used to receive the driving voltage required for IC 324, pins 3 and 6 are terminals Y1 and Y2 respectively and are connected to the serial ports of the I/O controller, pins 2 and 5 are terminals Z1 and Z3 respectively and are connected to the serial transceiver of the system, pins 1 and 7 are used to receive the second control signal S2 and control the conduction of the connection between terminals Y1 and Z1 and the conduction of the connection between terminals Y3 and Z3. In addition, pin 4 of IC 326 is connected to ground, pin 8 is used to receive the driving voltage required for IC 326, pins 2 and 5 are terminals Y2 and Y4 respectively and are connected to the serial ports of the I/O controller, pins 3 and 6 are terminals Z2 and Z4 respectively and are connected to the serial transceiver of the system, pins 1 and 7 are used to receive the second control signal S2 and control the conduction of connection between terminals Y2 and Z2 and the connection between terminals Y4 and Z4. As such, switching on/off of the communication path between the serial port of the I/O controller and the serial transceiver of the system can be realized.

Figure 10:
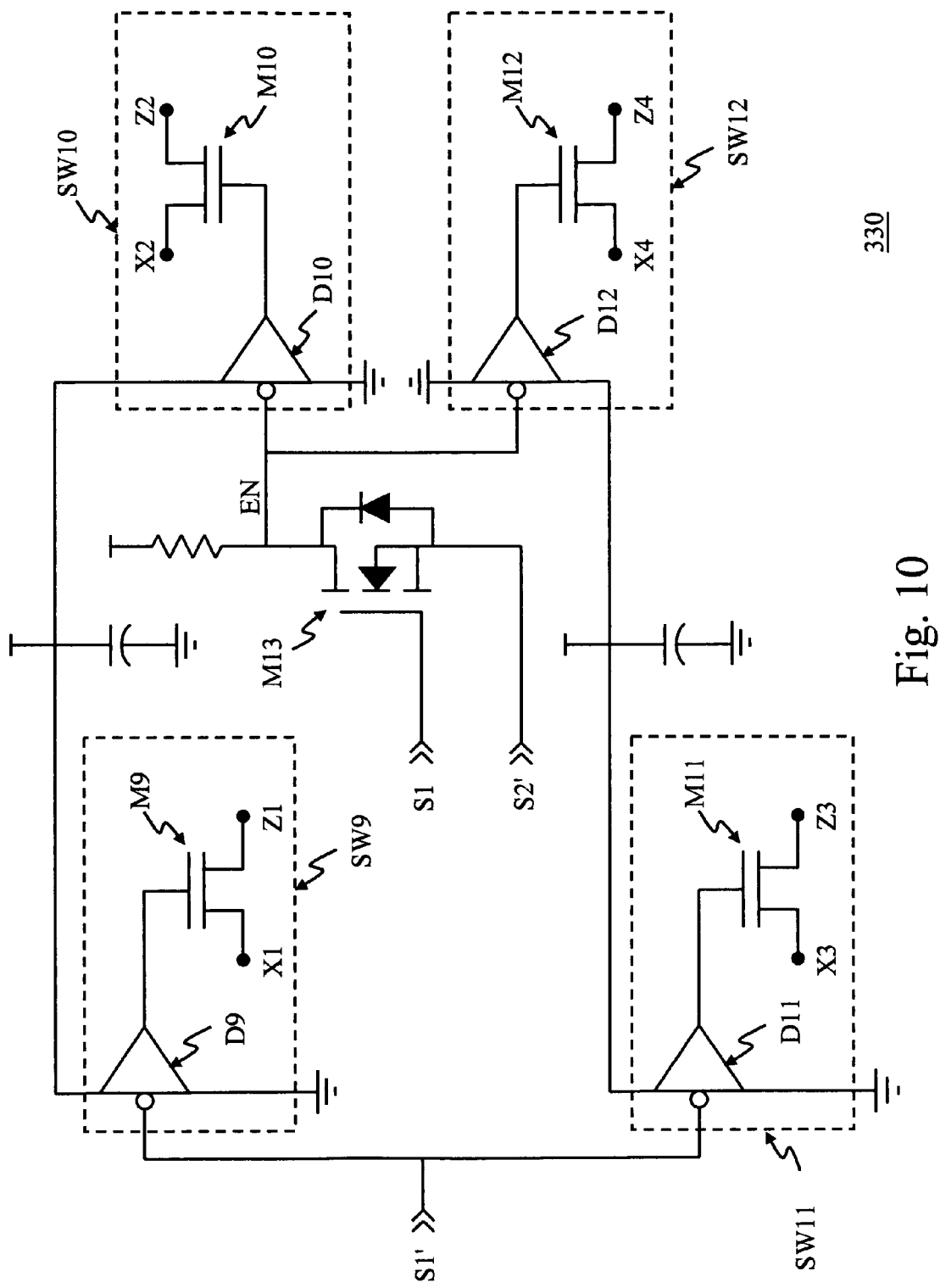
FIG. 10 is a circuit diagram of the third switching device shown in FIG. 3 according to a first embodiment of the invention.

Refer to FIG. 10 for a circuit diagram of the third switching device shown in FIG. 3 according to a first embodiment of the invention. As shown in FIG. 10, the third switching device 330 is composed of a multiplexer sub-switch M13 and four switches (hereinafter referred to as the ninth switch SW9, the tenth switch SW10, the eleventh switch SW11, and the twelfth switch SW12 respectively). And each of the respective switches is provided with a corresponding simplex sub-switch M9, M10, M11, or M12. For each of the simplex sub-switches M9, M10, M11, and M12, the terminals X1, X2, X3, and X4 are connected to the serial ports of BMC, while the terminals Z1, Z2, Z3, and Z4 are connected to the serial transceiver of the system. Herein, the simplex sub-switch utilized can be a transistor, which can be BJT, MOSFET, or JEFT etc.

In the above-mentioned structure, the communication path between the serial port of BMC and the serial transceiver of the system can be utilized to transmit four kinds of signals, namely, the receiving-data signal, the transmitting-data signal, the clear-to-send signal, and the request-to-send signal. For easy of understanding and explanation, assuming that terminals X1 and Z1 are used for the receiving-data signals, terminals X2 and Z2 are used for the transmitting-data signals, terminals X3 and Z3 are used for the clear-to-send signals, and terminals X4 and Z4 are used for the request-to-send signals.

Figure 11A:
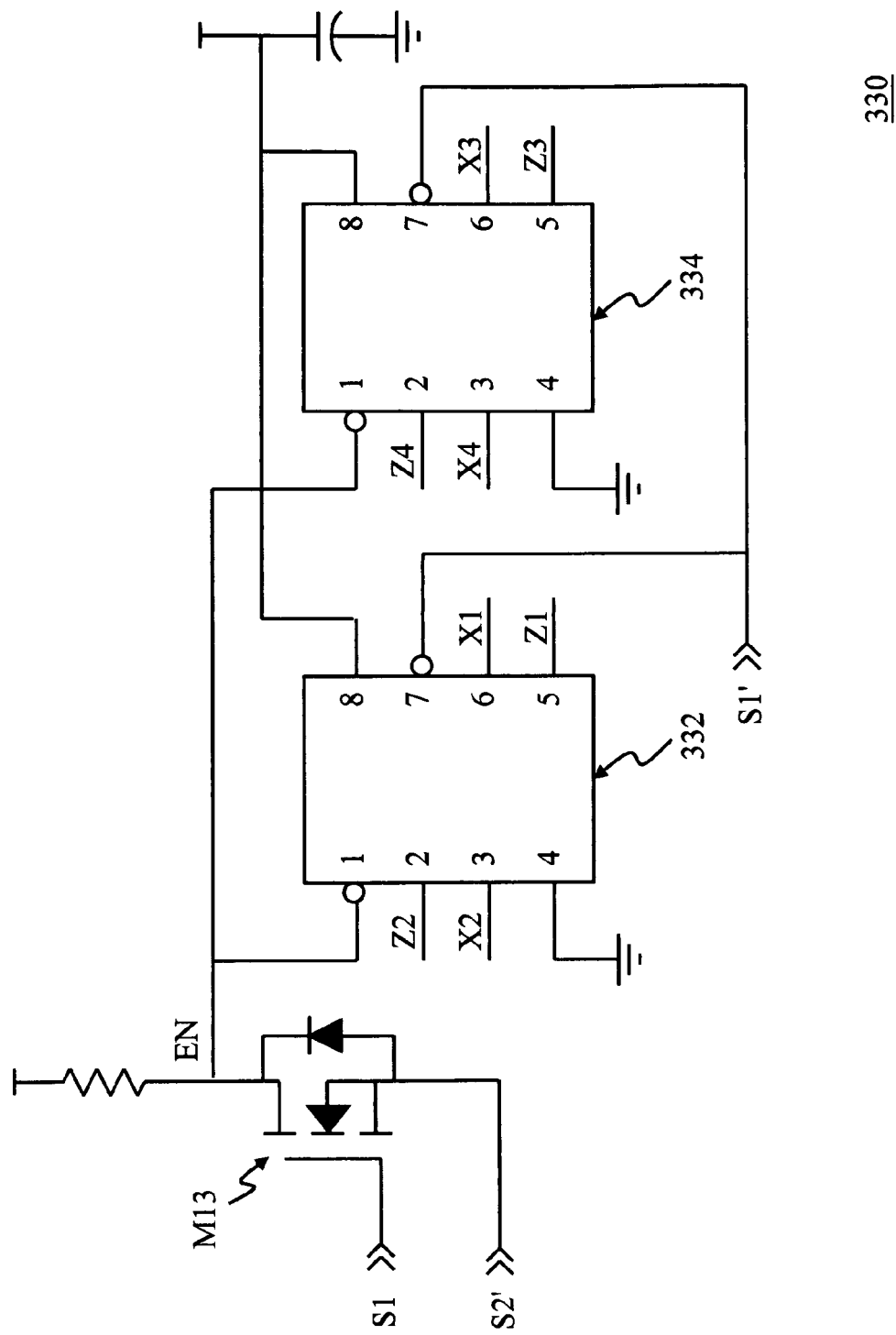
FIG. 11A is a circuit diagram of the third switching device shown in FIG. 3 according to a second embodiment of the invention.
Figure 11B:
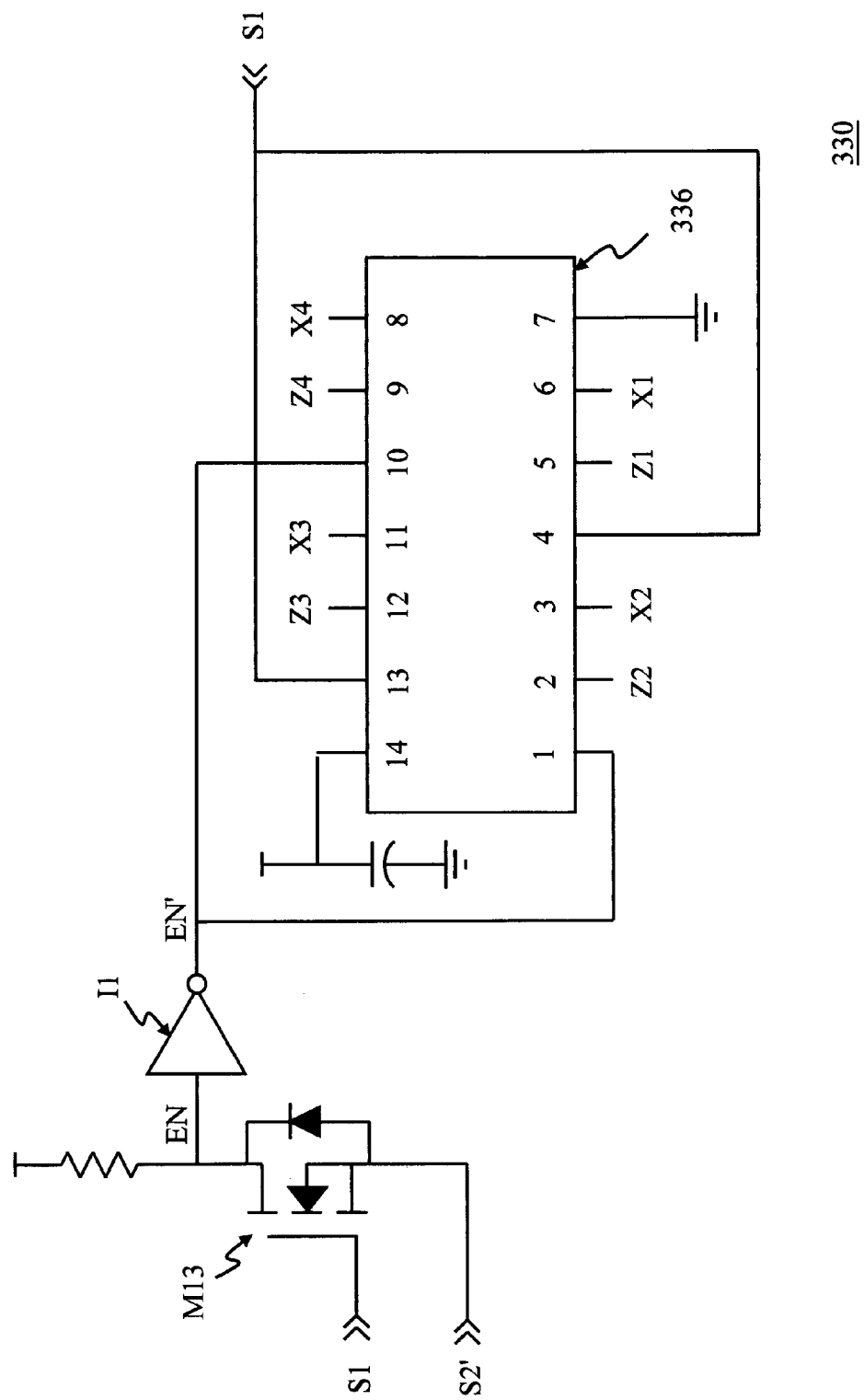
FIG. 11B is a circuit diagram of the third switching device shown in FIG. 3 according to a third embodiment of the invention.

In this respect, upon being inverted, the first control signal is turned into an inverted first signal S1' and is input into the ninth switch SW9 and the eleventh switch SW11, thus controlling the turn-on and turn-off of the respective simplex sub-switches M9 and M11. In other words, after inversion and then buffered by the buffers D9 and D11, the inverted first signal S1' is input into and control the simplex switch M9 in conducting the connection between terminals X1 and Z1, and input into and control the simplex switch M11 in conducting the connection between terminals X3 and Z3. In addition, an inverted second signal S2' and a first control signal S1 are input into a multiplexer sub-switch M13, hereby generating an enable-signal EN to the tenth switch SW10 and the twelfth switch SW12. As shown in FIG. 11B, the multiplexer sub-switch M13 includes a transistor, with its source used to receive the inverted second signal S2', its gate used to receive the first control signal S1, and its drain used to generate enable-signal EN. After inversion and buffered by the buffers D10 and D12, the enable-signal EN is input into the simplex sub-switch M10 for controlling the conduction of the connection between terminals X2 and Z2, and is input into the simplex sub-switch M12 for controlling the conduction of the connection between terminals X4 and Z4. As such, realizing the switching-on or -off of the communication path between the serial port of BMC and the serial transceiver of the system.

In this respect, the second inverted signal S2' can be obtained through inverting the second control signal S2 by making use of an inverter circuit 342 as shown in FIG. 8. Similarly, the first inverted signal S1' can be obtained through inverting the first control signal S1 by means of an inverter circuit 340 as shown in FIG. 6.

In the above description, any two of the switches can be replaced by an integrated circuit. For easy understanding and explanation, assuming that the IC 332 is used to replace the ninth and the tenth switches, while IC 334 is used to replace the eleventh and twelfth switches as shown in FIG. 11A. In other words, the third switching device 330 can be realized by the ICs 332 and 334. In this structure, pin 4 of IC 332 is connected to ground, pin 8 is used to receive the driving voltage required for IC 332, pins 3 and 6 are terminals X2 and X1 respectively and are connected to the serial ports of BMC, pins 2 and 5 are terminals Z2 and Z1 respectively and are connected to the serial transceiver of the system. In addition, pin 4 of IC 334 is connected to ground, pin 8 is used to receive the driving voltage required for IC 334, pins 3 and 6 are terminals X4 and X3 respectively and are connected to the serial port of BMC, and pins 2 and 5 are terminals Z4 and Z3 respectively and are connected to the serial transceiver of the system.

In this respect, an enable-signal EN is generated by a multiplexer sub-switch M13 based on an inverted second signal S2' and a first control signal S1, and is input into pin 1 of IC 332 and pin 1 of IC 334 respectively, thus controlling the conduction of connection between terminals X2 and Z2, and the conduction of connection between terminals X4 and Z4. Meanwhile, an inverted first signal S1' is input into pin 7 of IC 332 and pin 7 of IC 334 respectively, hereby controlling the conduction of connection between terminals X1 and Z1, and the conduction of connection between terminals X3 and Z3. As such, realizing the switching-on or -off of the communication path between the serial port of BMC and the serial transceiver of the system.

In addition, the third switching device 330 can be realized by an integrated circuit 336, as shown in FIG. 11B. In this structure, pin 7 of IC 336 is connected to ground, pins 14 is used to receive the driving voltage required for IC 336, pins 3, 6, 8 and 11 are terminals X2, X1, X4 and X3 respectively and are connected to the serial ports of BMC, and pins 2, 5, 9, and 12 are terminals Z2, Z1, Z4 and Z3 respectively and are connected to the serial transceiver of the syste In the above-mentioned structure, an enable-signal EN is generated by the multiplexer sub-switch M13 based on an inverted second signal S2' and a first control signal S1, and then inverted by a third inverter 11 to generate an inverted enable-signal EN' and input into pins 1 and 10 of IC 336, thus controlling the conduction of connection between terminals X2 and Z2, the conduction of connection between terminals X4 and Z4 respectively. In addition, a first control signal S1 is input pins 4 and 13 of IC 336, hereby controlling the conduction of connection between terminals X1 and Z1, the conduction of connection between terminals X3 and Z3 respectively. As such, realizing the switching-on or -off of the communication path between the serial port of BMC and the serial transceiver of the system.

In this connection, the construction of the third inverter 11 is the same as that of the first or second inverter.

Subsequently, the operation principle of the serial multiplexer module according to the invention will be described further in detail. In the following description, refer to FIG. 3, and assuming that the serial multiplexer module of the invention is realized by the first switching device 310, the second switching device 320, and the third switching device 330 as shown in the structures of FIGS. 4, 7 and 10.

When the first control signal S1 and the second control signal S2 output from the respective pins G1 and G2 of GPIO are both at high voltage levels, then the inverted second signal S2' is at low voltage level, the inverted first signal S1' is at low voltage level, and the enable-signal EN is at low voltage level. At this time, the simplex sub-switches M1, M2, M3, M4, M5, M6, M7 and M8 are turned off, while the simplex sub-switches M9, M10, M11, and M12 are turned As such, the serial port SP of BMC 100 can be serially connected to the serial transceiver 220 of system 200.

When the first control signal S1 and the second control signal S2 output from the pins G1 and G2 of GPIO are at low and high voltage levels respectively, then the inverted second signal S2' is at low voltage level, the inverted first signal S1' is at high voltage level, and the enable-signal EN is at high voltage level. At this time, the simplex sub-switches M5, M6, M7, M8, M9, M10, M11 and M12 are turned off, while the simplex sub-switches M1, M2, M3, and M4 are turned When the first control signal S1 and the second control signal S2 output from the pins G1 and G2 of GPIO are at high and low voltage levels respectively, then the inverted second signal S2' is at high voltage level, the inverted first signal S1' is at low voltage level, and the enable-signal EN is at high voltage level. At this time, the simplex sub-switches M1, M2, M3, M4, M10, and M12 are turned off, while the simplex sub-switches M5, M6, M7, M8, M9, and M11 are turned on. Thus, the communication path between the serial port SP of BMC 100 and the serial transceiver 220 of system 200, for instance, the receiving data communication path and the clear-to-send communication path, are made to be conductive.

Summing up the above, in the invention a serial multiplexer module is disclosed, which is composed of a first switching device, a second switching device, and a third switching device, and are connected respectively to a Baseboard Management Controller (BMC), an I/O controller and a serial transceiver. These switches are controlled to turn-on or turn-off directly/indirectly through a first control signal and/or second control signal transmitted by BMC. In this structure, the first, second, and third switching devices includes four simplex sub-switches respectively. In practice, the four simplex sub-switches of the respective switching devices can be combined and integrated two-by-two into an integrated circuit (IC). Moreover, the serial multiplexer module of the invention may include one or more first and second inverters, thus generating a first and a second inverted signals. A multiplexer sub-switch is utilized in the invention to generate an enable-signal based on a first control signal and an inverted second signal. A third inverter is further provided to invert the enable-signal, hereby producing an inverted enable-signal. Furthermore, one or more buffers may be provided in the serial multiplexer module of the invention to provide the buffer function.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A serial multiplexer module for controlling communication between a baseboard management controller (BMC), an input/output (I/O) controller, and a serial transceiver, said I/O controller and said serial transceiver being disposed on a mother board of a computer system, said serial multiplexer module comprising:
a first switching device in circuit connection with said BMC and said I/O controller, controlled directly/indirectly by a first control signal transmitted by said BMC;
a second switching device in circuit connection with said I/O controller and said serial transceiver, controlled directly/indirectly by a second control signal transmitted by said BMC;
a third switching device in circuit connection with said BMC and said serial transceiver, controlled directly/indirectly by said first control signal and said second control signal transmitted by said BMC;
at least one first inverter for inverting said first control signal and generating an inverted first signal; and
at least one second inverter for inverting said second control signal and generating an inverted second signal;
wherein each of said first, second, and third switching devices has respectively four simplex sub-switches controlled directly/indirectly by said first control signal and/or said second control signal to switch on/off respectively.

2. The serial multiplexer module of claim 1, wherein the four simplex sub-switches of said first switching device are controlled to be switched on/off by said inverted first signal, thereby enabling the communication between said BMC and said I/O controller.

3. The serial multiplexer module of claim 1, wherein said first inverter includes a transistor composed of a gate, a source, and a drain, said source being connected to ground, said gate being used to receive said first control signal, and said drain being used to generate said inverted first signal.

4. The serial multiplexer module of claim 1, wherein the four simplex sub-switches of said second switching device are controlled to be switched on/off by said inverted second signal, thereby enabling the communication between said I/O controller and said serial transceiver.

5. The serial multiplexer module of claim 1, wherein said second inverter includes a transistor composed of a gate, a source, and a drain, said source being connected to ground, said gate being used to receive said second control signal, and said drain being used to generate said inverted second signal.

6. The serial multiplexer module of claim 1, wherein said third switching device further includes a multiplexer switch for generating an enable-signal according to said first control signal and said inverted second signal, thereby controlling directly/indirectly at least one of the four simplex sub-switches of said third switching device.

7. The serial multiplexer module of claim 6, wherein said multiplexer sub-switch includes a transistor comprising a gate, a source, and a drain, said source being used to receive said inverted second signal, said gate being used to receive said first control signal, and said drain being used to generate said enable-signal.

8. The serial multiplexer module of claim 6, further comprising at least one third inverter for inverting said enable-signal and generating an inverted enable-signal.

9. The serial multiplexer module of claim 8, wherein said third inverter includes a transistor comprising a gate, a source, and a drain, said source being connected to ground, said gate being used to receive said enable-signal, and said drain being used to generate said inverted enable-signal.

10. The serial multiplexer module of claim 1, wherein said second switching device is connected to said serial transceiver through a first link connection, and is connected to said I/O controller through a second link connection; and said third switching device is connected to one of said first link connection and said second link connection through a third link connection, thereby enabling said BMC to monitor the communication between said serial transceiver and said I/O controller.

11. The serial multiplexer module of claim 1, wherein said BMC is disposed on a server management daughter card, and said serial multiplexer module is disposed on either said mother board or said server management daughter card.

12. The serial multiplexer module of claim 1, wherein both said BMC and said serial multiplexer module are disposed on said mother board.

13. The serial multiplexer module of claim 1, wherein each of said first, second and third switching devices includes at least one buffer respectively.

14. The serial multiplexer module of claim 1, wherein the four simplex sub-switches in said first switching device are integrated two-by-two on two ICs.

15. The serial multiplexer module of claim 1, wherein the four simplex sub-switches in said second switching device are integrated two-by-two on two ICs.

16. The serial multiplexer module of claim 1, wherein the four simplex sub-switches in said third switching device are integrated two-by-two on two ICs.

* * * * *